US007346534B1

(12) United States Patent
Martin et al.

(10) Patent No.: US 7,346,534 B1
(45) Date of Patent: Mar. 18, 2008

(54) METHOD FOR FACILITATING SUPPLIER-CUSTOMER COLLABORATION USING THE INTERNET

(75) Inventors: Jinger J. Martin, Stillwater, OK (US); Danelle R. Luft, Oshkosh, WI (US); Peris L. Brodsky, Riverwoods, IL (US); Anita A. Breen, West Chicago, IL (US)

(73) Assignee: Brunswick Corporation, Lake Forest, IL (US)

( * ) Notice: Subject to any disclaimer, the term of this patent is extended or adjusted under 35 U.S.C. 154(b) by 1193 days.

(21) Appl. No.: 10/152,749

(22) Filed: May 22, 2002

(51) Int. Cl.
*G06F 9/46* (2006.01)
(52) U.S. Cl. .................... 705/9; 705/7; 705/8
(58) Field of Classification Search .......... 705/7, 705/28
See application file for complete search history.

(56) References Cited

U.S. PATENT DOCUMENTS

| | | | | |
|---|---|---|---|---|
| 4,528,643 | A | 7/1985 | Freeny, Jr. | 364/900 |
| 5,479,343 | A * | 12/1995 | Matoba et al. | 700/106 |
| 5,704,017 | A | 12/1997 | Heckerman et al. | 395/61 |
| 5,708,780 | A | 1/1998 | Levergood et al. | 395/200 |
| 5,715,314 | A | 2/1998 | Payne et al. | 380/24 |
| 6,098,893 | A | 8/2000 | Berglund et al. | 236/51 |
| 6,188,989 | B1 * | 2/2001 | Kennedy | 705/8 |
| 6,240,415 | B1 | 5/2001 | Blumberg | 707/9 |
| 6,266,668 | B1 | 7/2001 | Vanderveldt et al. | 707/10 |
| 6,578,013 | B1 * | 6/2003 | Davis et al. | 705/26 |
| 6,920,366 | B1 * | 7/2005 | Luh et al. | 700/101 |

| | | | | |
|---|---|---|---|---|
| 2002/0099579 | A1 * | 7/2002 | Stowell et al. | 705/7 |

FOREIGN PATENT DOCUMENTS

JP  02000085925  A  *  3/2000

OTHER PUBLICATIONS

Hausman et al "Multiproduct Production Scheduling For Style Goods With Limited Capacity, Forecast Revisions and Terminal Delivery", Mar. 1972, Management Science vol. 18, No. 7, pp. 370-383.*
Halsal et al (A production Planning and Scheduling Framework for Smaller Manufacturing Enterprises), Jul. 1993, Science and Engineering Research, pp. 1-6.*

(Continued)

*Primary Examiner*—Romain Jeanty
(74) *Attorney, Agent, or Firm*—William D. Lanyi (57) ABSTRACT

A method for providing a collaborative production scheduling system uses the internet and allows a supplier and its customers to interact with a data set that contains forecast information relating to products manufactured by the supplier and purchased by the customers. An initial forecast is provided by the supplier for each of a plurality of customers and those forecasts are made available for access by the customers. Each of the customers of the supplier is allowed to review and access the data contained in the forecast schedule at predetermined periods of time (e.g. monthly) and for preselected durations (e.g. fifteen days). During those times, all of the customers of the supplier can amend the predetermined forecast schedule based on their own estimates of their future demand for the suppliers products. The supplier then can accumulate the information obtained from its customers and schedule production at its own facilities in order to appropriately meet the anticipated demand of its customers.

22 Claims, 6 Drawing Sheets

OTHER PUBLICATIONS

Jeffrey et al "International supply chain management in an Internet environment: A network-oriented approach to internationalization", Jan. 2001, International Marketiing Review v18n4 pp. 392-419, Dialog file 15, Accession No. 02557942.*

Dialog "Commerce One Announces Availability of Collaborative Procurement Solution", Jun. 2001, Business Wire , p. 0403, Dialog file 621, Accession No. 02914530.*

* cited by examiner

METHOD FOR FACILITATING SUPPLIER-CUSTOMER COLLABORATION USING THE INTERNET

BACKGROUND OF THE INVENTION

1. Field of the Invention

The present invention is generally related to a method for forecasting a supplier's future production requirements and, more particularly, a internet system for allowing a customer and a supplier to collaborate in forecasting a number of units of a product to be shipped by the supplier to the customer.

2. Description of the Prior Art

The internet has been used in many different ways to connect customers and suppliers together in a business relationship. It is very common for a consumer to use the internet to find a product or service, compare the prices offered by various competitive suppliers, and actually purchase the product.

A manufacturer of a product typically must be able to predict future demand for the product so that sufficient quantities of the product can be manufactured in advance of the actual date when the product is to be shipped to the purchaser. Many different types of forecasting models have been used to predict future demand so that a supplier can schedule its factory production in a way that efficiently meets that demand.

U.S. Pat. No. 5,715,314, which issued to Payne et al on Feb. 3, 1998, describes a network sales system that includes at least one buyer computer for operation by a user desiring to buy a product, at least one merchant computer, and at least one payment computer. The buyer computer, the merchant computer, and the payment computer are interconnected by a computer network. The buyer computer is programmed to receive a user request for purchasing a product, and to cause a payment message to be sent to the payment computer that comprises a product identifier identifying the product. The payment computer is programmed to receive the payment message, to cause an access message to be created that comprises the product identifier and an access message authenticator based on a cryptographic key, and to cause the access message to be sent to the merchant computer. The merchant computer is programmed to receive the access message, to verify the access message authenticator to ensure that the access message authenticator was created using the cryptographic key, and to cause the product to be sent to the user desiring to buy the product.

U.S. Pat. No. 5,708,780, which issued to Levergood et al on Jan. 13, 1998, describes an internet server access control and monitoring system. The invention relates to methods for controlling and monitoring access to network servers. In particular, the process described in the invention includes client-server sessions over the internet involving hypertext files. In the hypertext environment, a client views a document transmitted by a content server with a standard program known as the browser. Each hypertext document or page contains links to other hypertext pages which the user may select to traverse. When the user selects a link that is directed to an access-control file, the server subjects the request to a secondary server which determines whether the client has an authorization or valid account. Upon such verification, the user is provided with a session identification which allows the user to access to the requested file as well as any other files within the present protection domain.

U.S. Pat. No. 4,528,643, which issued to Freeny, Jr. on Jul. 9, 1985, describes a system for reproducing information in material objects at a point of sale location. The invention contemplates a system for reproducing information in material objects at a point of sale location wherein the information to be reproduced is provided at the point of sale location from a location remote with respect to the point of sale location, an owner authorization code is provided to a point of sale location in response to receiving a request code from the point of sale location requesting to reproduce predetermined information in a material object, and the predetermined information is reproduced in a material object at the point of sale location in response to receiving the owner authorization code.

U.S. Pat. No. 5,704,017, which issued to Heckermann et al on Dec. 30, 1997, describes a collaborative filtering utilizing a belief network. The disclosed system provides an improved collaborative filtering system by utilizing a belief network, which is sometimes known as a Bayesian network. The disclosed system learns a belief network using both prior knowledge obtained from an expert in a given field of decision making and a database containing empirical data obtained from many people. The empirical data contains attributes of users as well as their preferences in the field of decision making. After initially learning the belief network, the belief network is relearned at various intervals when additional attributes are identified as having a causal effect on the preferences and data for these additional attributes can be gathered. This relearning allows the belief network to improve its accuracy in predicting preferences of a user. Upon iteration of relearning, a cluster model is automatically generated that best predicts the data in the database. After relearning the belief network a number of times, the belief network is used to predict the preferences of a user using probabilistic inference. In performing a probabilistic inference, the known attributes of the user are received and the belief network is accessed to determine the probability of the unknown preferences of the user given the known attributes. Based on these probabilities, the preference most likely to be desired by the user can be predicted.

U.S. Pat. No. 6,098,893, which issued to Berglund et al on Aug. 8, 2000, describes a comfort control system incorporating weather forecast data and a method for operating such a system. In a comfort controls system for multiple buildings, whether residential, commercial or industrial, a weather forecast unit sends weather forecast data over the internet to a building management provider which handles building management services for a number of clients, each having a number of buildings and properties. At the provider's reception station, data on the external building characteristics of all the buildings are complied with the received data and then fed to the appropriate building management controls system.

U.S. Pat. No. 6,240,415, which issued to Blumberg on May 29, 2001, describes a corporate and entertainment management interactive system using a computer network. A system, method, and apparatus is provided for a computerized management of a method of corporate, business or sports management by a remote party comprising relating a current database of an entity. For instance, in sports management substantially real time management is possible. Data of a player together with a historical database related to that player and decisions can be transmitted. This is communicated between a central database processing resource and at least one remote party. A remote party is permitted to access the database and access designated data from the database, and input and output data. Voting and management of the player, team, or business is possible in substantially real time or near real time by the remote party. A remote user can vote on financial compensation for a player, a coach or a team and/or for a bonus for a player, team or game. Similarly, hiring and firing decisions can be made. Shareholders, fans or customers of an entertainment business such as sports can be more interactively involved in all aspects of management and ownership duties and thus be more thoroughly entertained.

U.S. Pat. No. 6,266,668, which issued to Vanderveldt et al on Jul. 24, 2001, describes a system and method for dynamic data-mining and on-line communication of customized information. A method and system for dynamically searching databases in response to a query is provided by the present invention. More specifically, a system and method for dynamic data-mining and on-line communication of customized information. This method includes the steps of first creating a search-specific profile. This search-specific profile is then input into a data-mining search engine. The data-mining search engine will mine the search-specific profile to determine topic of interests. These topics of interests are output to at least one search tool. These search tools match the topics of interests to at least one destination data site wherein the destination data sites are evaluated to determine if relevant information is present in the destination data site. Relevant information is filtered and presented to the user making the inquiry.

The patents described above are hereby expressly incorporated by reference in the description of the present invention.

Manufacturers must be able to forecast future demand of their products in order to schedule factory production, purchase raw materials, provide sufficient inventory buildup, and hire personnel if needed. Forecasts of future demand are often made as a function of the overall national economy in combination with analyses of both short term and long term trends. It would be significantly beneficial if a more accurate and current system could be developed that actually allows a manufacturer to use forecasts which are made by its own customers with regard to their predicted demand of the supplier's products in the future.

SUMMARY OF THE INVENTION

A method for coordinating production of a product, by a supplier, with requirements of one or more customers, made in accordance with the preferred embodiment of the present invention, comprises the steps of determining a first delivery forecast schedule for a first product for a plurality of preselected future periods of time, such as weeks, months, or quarters. The first delivery forecast schedule, initially provided by the supplier, defines an estimated number of units of the first product that will be required by the first customer for each one of the plurality of preselected future periods of time. The method further comprises the step of making the first delivery forecast schedule available to the first customer on the internet and permitting the first customer to create an amended first delivery forecast schedule by amending the number of units associated with one or more of the plurality of preselected future periods of time of the first delivery forecast schedule. The method further comprises the steps of accessing the amended first delivery forecast schedule subsequent to the permitting step and then scheduling production of the first product by the supplier as a function of the amended first delivery forecast schedule. As a result of the present invention, the supplier can schedule its production as a direct function of a forecast made by the supplier's actual customers.

Each of the plurality of preselected future periods of time can be a calendar month, a calendar week, or a calendar quarter. The length of the time period is not limiting to the present invention. The method further comprises the steps of comparing the amended first delivery forecast schedule to the first delivery forecast schedule and determining, as a function of the comparing step, whether the amended version of the forecast production schedule is acceptable. Typically, the determining step checks the suggested changes entered by the customer with an acceptable magnitude of change to make sure that the customer has not made an error when entering the amended number of units for any particular one of the plurality of preselected future periods of time. If the change made by the customer is outside of a preselected acceptable range of change, an alarm message is provided to alert the first customer and request that the change be checked to make sure that it is proper.

When the supplier is a manufacturer of the first product, the information obtained by the combined inputs of all of the supplier's customers can be used to order raw materials, schedule factory production, control inventory levels, and arrange for shipping of the products to the customers when they are needed. The method of the present invention, described immediately above, is described in terms of a first customer and a first product. However, it should be understood that the present invention can further comprise determining a second delivery forecast schedule for a second product for the plurality of preselected future periods of time, wherein the second delivery forecast schedule defines an estimated number of units of the second product required by the first customer for each one of the plurality of preselected future periods of time. The second delivery forecast schedule is made available to the first customer on the internet and the first customer is permitted to create an amended second delivery forecast schedule by amending the number of units associated with one or more of the plurality of preselected future periods of time of the second delivery forecast schedule. After the permitting step, the supplier accesses the amended second forecast schedule and schedules production of the first and second products by the supplier as a function of the amended first and second delivery forecast schedules.

The invention further comprises making available the first delivery forecast schedule to a second customer and permitting the second customer to create the amended first delivery forecast schedule by amending the number of units associated with one or more of the plurality of preselected future periods of time. The supplier then accesses the amended first delivery forecast schedule subsequent to the permitting step and schedules production of the first product by the supplier as a function of the amended first delivery forecast schedule.

In a preferred embodiment of the present invention, many customers of the supplier are granted access to their particular portions of the forecast schedule in order to allow each of those customers to individually amend the forecast schedule pertaining to that customer. Each of the plurality of customers would be able to amend the forecast schedule relating to a plurality of different products provided by the supplier to the customers. After all of the customers of the supplier make their changes to the forecast schedule, the supplier schedules factory production as a function of the total number of each of the products that is included in the forecast by its customers. Instead of requiring that the supplier attempt to forecast the intended purchases by the customers, the present invention uses forecast numbers actually provided by the customers by allowing the customers to actually express their future intent with regard to predicted and actual orders of the products provided by the supplier.

Stated alternatively, the method for coordinating production by a supplier with requirements of one or more customers made in accordance with the preferred embodiment of the present invention comprises the steps of providing a data set, accessible on the internet, having a first portion associated with a first customer and a second portion associated with a second customer. The first portion comprises a first forecast demand schedule for a first product and a second product. The first forecast demand schedule defines an estimated number of units of the first and second products that are expected to be required by the first customer for each of a plurality of preselected future periods of time. The method further comprises the step of allowing the first customer to access the first forecast demand schedule of the first portion of the data set on the internet. It also comprises the step of allowing the first customer to change the estimated number of units of the first and second products expected to be required by the first customer for one or more of the plurality of preselected future periods of time. The method of the present invention further comprises the step of utilizing the first forecast demand schedule of the first portion of the data set, subsequent to the first customer accessing the first forecast demand schedule of the first portion of the data set on the internet, in order to schedule production of the first and second products by the supplier.

The first portion of the data set further comprises a first order schedule for the first and second products and the first order schedule defines a number of units of the first and second products actually ordered by the first customer for delivery to the first customer in one or more of the plurality of preselected future periods of time.

The present invention can further comprise the steps of allowing the second customer to access the second forecast demand schedule of the second portion of the data set on the internet and allowing the second customer to change the estimated number of units of the first and second products required by the second customer for one or more of the plurality of preselected periods of time. Furthermore, it comprises the step of utilizing the first and second forecast demand schedules of the first and second portions of the data set, respectively, subsequent to the first and second customers accessing the first and second forecast demand of the first and second portions of the data set, to schedule production of said first and second products by the supplier.

The second portion of the data set can also comprise a second order schedule for the first and second products. The second order schedule defines a number of units of the first and second products actually ordered by the second customer for delivery to the customer in one or more of the plurality of preselected future periods of time.

The present invention further comprises the step of utilizing the first and second forecast demand schedules of the first and second portions of the data set, respectively, subsequent to the first and second customers accessing the first and second forecast demand schedules of the first and second portions of the data set, to schedule production of the first and second products by the supplier.

The second portion of the data set can comprise a second order schedule for the first and second products. The second order schedule defines a number of units of the first and second products ordered by the second customer for delivery to the customer in one or more of the plurality of preselected future periods of time.

One feature of the method of the present invention further comprises the steps of measuring a first magnitude of a first difference between the first forecast demand schedule and the first order schedule and measuring a second magnitude of a second difference between the second forecast demand schedule and the second order schedule. It also comprises the steps of rewarding the first and second customers as a function of the first and second differences respectively. In other words, if one of the customers more accurately forecasts its future orders, a greater reward can be provided to that customer. A percentage rebate can be provided, for example, to the customer whose actual orders most closely match the forecast orders for that customer. In one embodiment of the present invention, the supplier is a manufacturer of marine propulsion systems, such as sterndrive units, inboard drive systems, and outboard motors, and the customers are original equipment manufacturers (OEM's) such as boat builders. By involving the boat builders directly in the forecasting process, through the use of the present invention, the marine propulsion system manufacturer can more accurately predict the weekly or monthly future demand because its customers are actually involved in providing estimates of that demand. When the customers, such as the boat builders, actually place firm orders for manufacturer's products, the customer who accurately forecasts a number of units that is generally equal to the number of units actually ordered by that customer can be rewarded financially by the manufacturer. These firm orders can be placed by the customer through traditional channels (e.g. conventional mail or telephone) or, in one embodiment of the present invention, by allowing the customer to directly enter the firm orders into the database through the internet.

Throughout the description of the present invention, the term "internet" shall be intended to refer to the publicly available internet and any alternative arrangement through which a supplier and its customers can share a common database as described herein. In other words, the internet system described herein can be designed to prohibit access by the public, with or without the appropriate log in names and passwords. Alternatively, the non-customer public can potentially access the website, but be blocked from accessing the database unless the appropriate information and password is provided.

BRIEF DESCRIPTION OF THE DRAWINGS

The present invention will be more fully and completely understood from a reading of the description of the preferred embodiment in conjunction with the figures, in which.

DESCRIPTION OF THE PREFERRED EMBODIMENT

Throughout the description of the preferred embodiment of the present invention, like components will be identified by like reference numerals.

Figure 1:
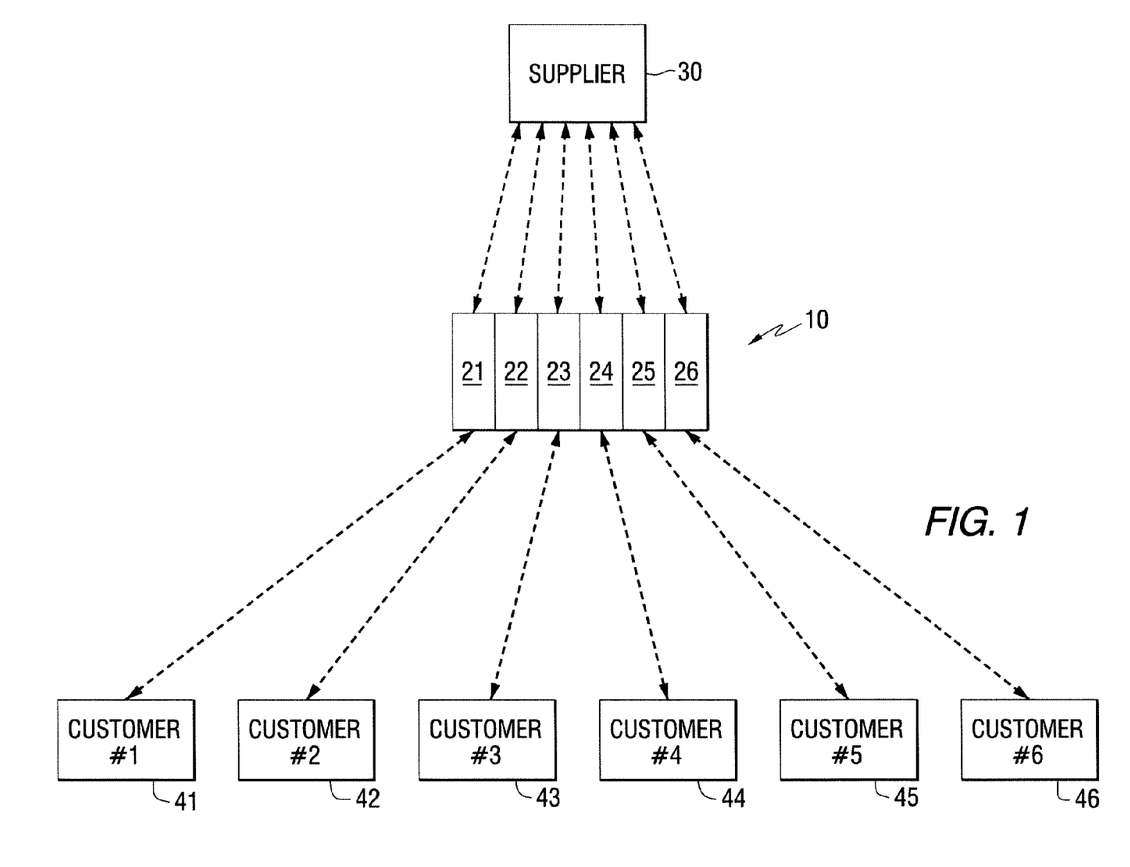
FIG. 1 is a schematic representation of the relationship between a supplier, a plurality of customers, and a data set containing forecast information.

FIG. 1 is a highly simplified schematic representation of the basic operation of the present invention. A data set 10 is provided and the data set includes a plurality of portions, in which each portion is associated with a different one of the customers of a supplier 30. Although six portions, 21-26, are illustrated in FIG. 1, it should be understood that this representation is exemplary and, in a typical application of the present invention, many more portions of the data set 10 would be provided. The data set 10 is made available on the internet to the customers, 41-46, of the supplier 30. It should also be understood that, although six customers are illustrated in FIG. 1, this number is merely exemplary and a typical application of the present invention would include a much larger number of customers that are given access to the data set 10.

Each of the customers, 41-46, is provided with a user name and a password. Access to the portion, which is one of the portions, 21-26, of the data set 10 relating to the accessing customer, who is one of the customers, 41-46, requires that the accessing customer enter a user name and a password which are associated with that customer and which will allow the customer to have access to certain data elements within the assigned one of the portions, 21-26, of the data set 10.

In a typical application of the present invention, initial data entries are provided by the supplier 10 in each of the portions, 21-26, of the data set 10 relating to the forecasts of future purchases by the associated customers, 41-46, of various products manufactured and supplied by the supplier 30. This initial forecast can be developed through an analysis of historic purchasing patterns by each of the customers, 41-46, both long term and short term trends in the industry in which the supplier 30 participates, national economic indicators, and other factors that the supplier 30 considers to be relevant to a forecast of future sales to its customers, 41-46. The initial forecast for each customer, developed by the supplier 30, is entered in the data set 10 and made available on the internet to the customers, 41-46. Although the customers have access, on the internet to the data set 10, they are not free to change the data in their respective portions, 21-26, unless the supplier 30 chooses to allow this. Periodically, the supplier 30 can notify the customers, 41-46, that it expects them to review the current forecast within their respective portions, 21-26, of the data set 10 and make any changes that they feel are appropriate. In a typical application of the present invention, this notification is made by e-mail to each of the individual customers, 41-46. In a preferred embodiment of the present invention, each of the customers is given approximately fifteen days to access the data set 10, review the entries in the forecast pertaining to that particular customer, and make any changes that are deemed to be appropriate.

During the fifteen days that are allowed for amending the forecast, the customers are expected to review their individual business plans, their current orders, and any other factors that may affect their future sales of the supplier's product and then amend the forecast of their future purchases from supplier 30 in their respective portion, 21-26, of the data set.

When the allowed time period (e.g. fifteen days) has elapsed, the supplier 30 accesses the data in the data set 10 to obtain cumulative totals for all of its products. In other words, the forecast magnitudes of a particular product are summed for all of the customers, 41-46, so that the supplier 30 can determine a total forecast demand for that particular product in the future. In a typical application of the present invention, the forecasts are segregated by week or by month and they extend for approximately one year into the future. This process therefore allows the supplier 30 to obtain a forecast estimate of future demand for each of its products in each of the preselected time periods within the future calendar year. An advantage of the present invention is that it allows the supplier 30 to obtain actual predictions from its individual customers of the future demand for the supplier's products from each of those individual customers.

As will be described in greater detail below, a particularly preferred embodiment of the present invention can also provide an on-line order entry system by which the individual customers, 41-46, can place a firm order for one or more of the supplier's products by simply amending an entry in the "order" line within that customer's portion, 21-26, of the data set 10. The supplier 30 is then able to treat the forecast numbers provided by the customers and the actual firm order numbers provided by the customers in individual ways. In other words, the forecast numbers can be used to determine the magnitude of certain purchases required by the supplier in order to meet the demand of its customers. Recognizing that the forecast numbers may not have the degree of accuracy that the supplier would like with regard to certain expensive purchases that may not be able to be easily rescinded, the supplier 30 may decide to use an adjustment factor when applying the forecast numbers to future factory scheduling and purchasing. The supplier 30 can decide to rely more heavily on actual firm order numbers provided by the customers, 41-46, in the data set 10. Regardless of the particular weight placed on each of these two available predictive values, the supplier 30 is provided with future estimates of customer demand that are based directly on numbers provided by the customers themselves. This ability significantly reduces the margin of error that is expected between the forecasts of future demand and the actual orders placed by the supplier's customers. A more simplified embodiment of the present invention receives firm orders through an alternate means (e.g. orders received by the supplier from the customer by mail or by telephone) and these firm orders are individually entered into the database by the supplier. In that particular embodiment of the present invention, the customer does not have the ability to actually enter the firm orders directly into the database over the internet. However, although both embodiments are within the scope of the present invention, it should be understood that the preferred one is to have the customer enter the firm orders directly into the database by using the internet.

Figure 2:
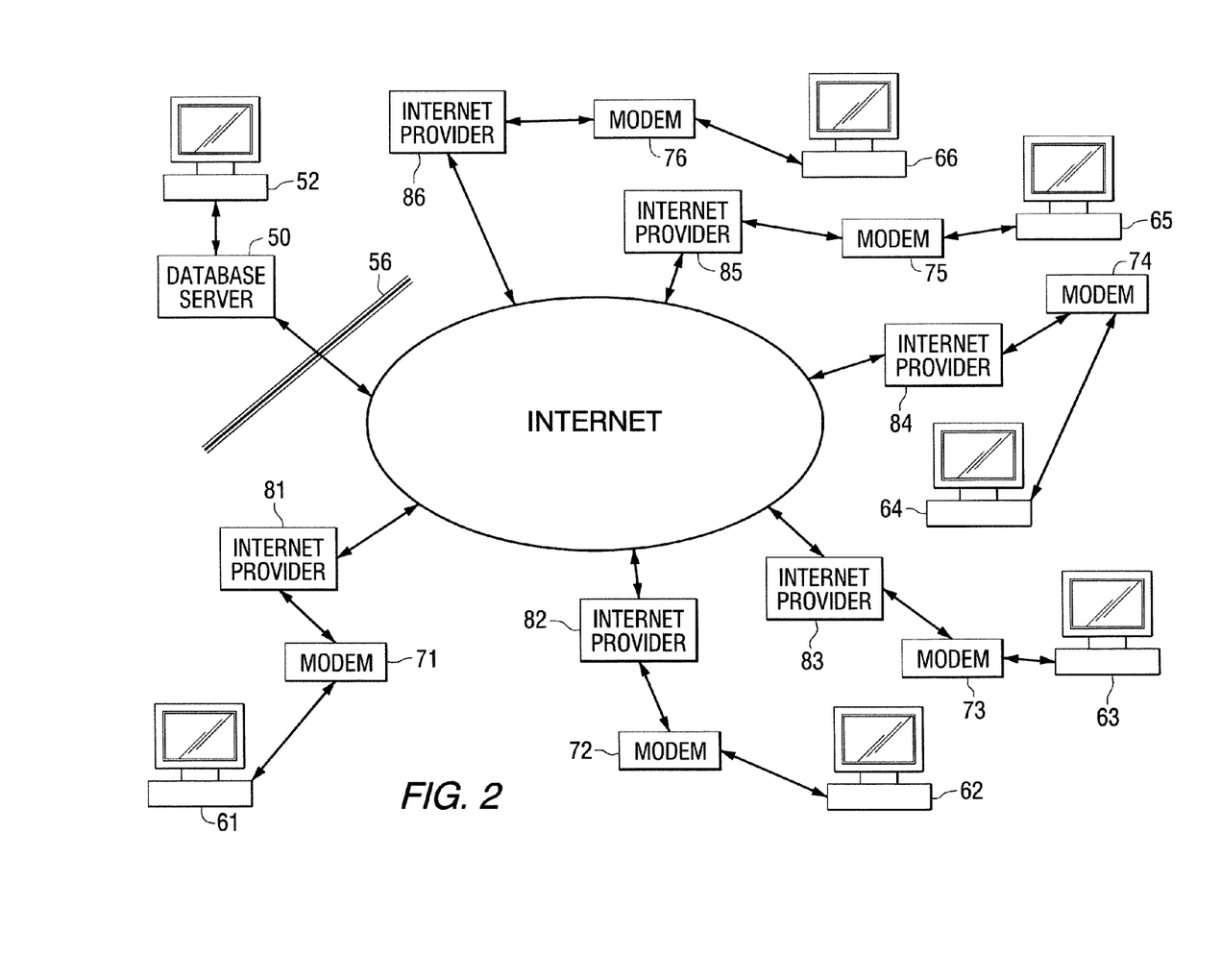
FIG. 2 is a schematic representation of a plurality of customers, a supplier, and communication therebetween on the internet.

FIG. 2 is a highly simplified representation of the overall configuration of the supplier 30 and its customers, as described in conjunction with FIG. 1, with the internet. In FIG. 2, the supplier's server 50 and associated terminal 52 allow the supplier 30 to communicate with its customers on the internet. A firewall 56 is illustrated to show its functional location with respect to the supplier's equipment. The data set 10 is maintained on the supplier's server 50.

In FIG. 2, six exemplary computer monitors, 61-66, are used to represent the computers of the six customers, 41-46, described above in conjunction with FIG. 1. For purposes of this example, each of the customers is connected to the internet through a modem, 71-76, and an internet provider, 81-86. However, it should be understood that the mode of connection to the internet, whether by modem or direct link, is not limiting to the present invention.

Each of the customers can access the data set 10 through the internet and review all of the data contained in their particular one of the portions, 21-26, of the data set 10. During preselected periods of time when the supplier 30 wishes to receive updates of the forecasts and/or firm orders from its customers, 41-46, notifications are sent from the supplier to each of the customers. These notifications are typically sent by e-mail to inform the customers that they are being granted access to the data set 10 for purposes of changing any of the forecast or firm order numbers contained therein. As described above, typically fifteen days is provided during which the customers have active access to the data set for purposes of not only reviewing the contents thereof, but changing some of these forecasts and firm orders.

Figure 3:
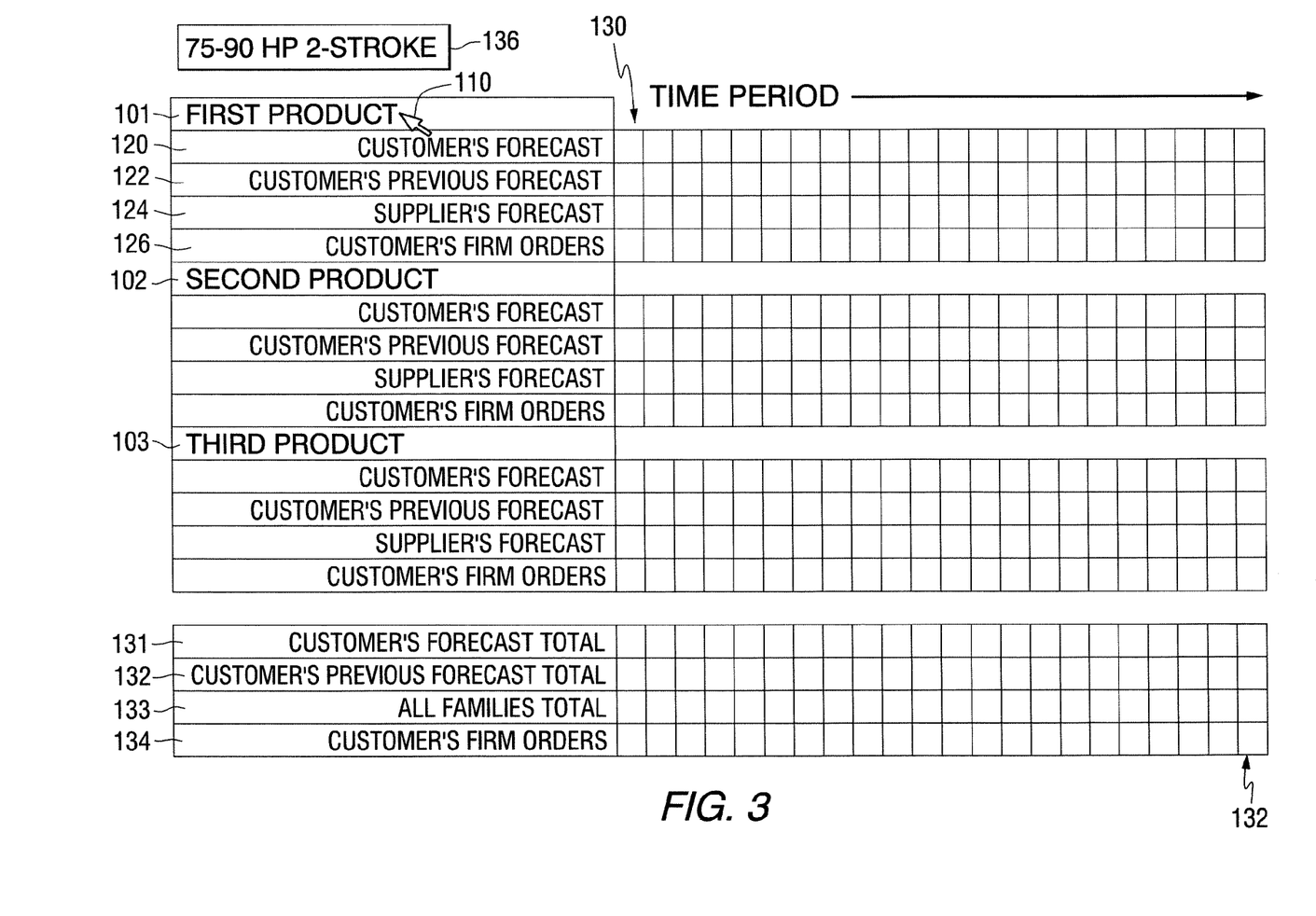
FIG. 3 is a generic representation of a data screen containing certain information that is made available to each of a plurality of customers of a supplier.

FIG. 3 is a exemplary screen display that one of the customers, 41-46, of the supplier 30 can view at its local computer. It should be clearly understood that each customer's view of the data within the data set 10 is limited to that portion, 21-26, of the data that pertains to that specific customer. In other words, one customer is not allowed to review or change data relating to another customer in most typical applications of the present invention.

In FIG. 3, three products, 101-103, are identified for this particular customer. In an actual application of the present invention, each of the three products, 101-103, would be identified by name. For example, as will be described in greater detail below with regard to FIG. 4, the first product 101 could be identified as "ME 75ELPTO" which identifies the particular product as being a Mercury Marine (i.e. "ME") 75 horsepower outboard motor with an electric power trim feature and oil injection. If, hypothetically, one of the products shown in FIG. 3 is identified as "ME 90ELPTO SW", this designation identifies the particular product as an outboard manufactured by Mercury Marine which is a 90 horsepower engine with electric power and trim and oil injection and which is particularly manufactured for use in salt water environments.

The screen display illustrated in FIG. 3 is an exemplary and generic graphical representation of the information stored in the data set 10. By moving the cursor symbol 110, the customer can access all of the necessary elements of the data set 10, either to review them for accuracy or to amend them during preselected and limited periods of time. As illustrated in FIG. 3, each of the products, 101-103, is associated with four lines which are generically referred to in FIG. 3 as the "customer's forecast" 120, the "customer's previous forecast" 122, the "supplier's forecast" 124, and the "customer's firm orders" 126. As will be described below in conjunction with FIG. 4, the precise words presented on the screen display are slightly different than those shown in FIG. 3. In FIG. 3, the terminology has been slightly modified to be more generic and to more closely conform to the terminology used in FIGS. 1 and 2 and the description above.

With continued reference to FIG. 3, the three forecast lines, 120, 122, and 124, and the firm order line 126 are provided for each of the products shown on the screen display. To the right of these descriptions, a plurality of preselected future periods of time are shown. From an earliest date column 130, each column progresses chronologically in a direction toward the right of the screen display with the last column 132 being the latest date column. Although numbers are not illustrated in the various data elements of the columns extending from column 130 to column 132, it should be understood that the intent of the present invention is to provide numbers that are equal to or greater than zero in each of the data boxes shown in FIG. 3. The embodiment of the present invention described herein typically contains numbers that represent units in each of the data entry boxes. These units represent number of units in each of the four described categories for each of the three products of the product family 136.

In a typical application of the present invention, the "supplier's forecast" row of data entries is chronologically the first to be provided. The numbers contained in the "supplier's forecast" row 124 represent initial estimates developed by the supplier based on historical evidence and various data relating to economic conditions. When the customer is allowed to access the data set 10, the "customer's forecast" row 120 can be changed by the customer. One or more of the chronologically ordered plurality of preselected future periods of time can be changed by the customer. Typically, it is expected that the customer will change the number of units forecast for delivery to that customer in that particular period of time based on that customer's personal knowledge pertaining to that customer's business.

When the customer is again allowed access to the data set 10 at some future time, the "customer's previous forecast" row 122 will show the entries of row 120 subsequent to the customer's last opportunity to access and amend the data. This same information will also be shown in row 120. In other words, before the customer again accesses the data set 10 to amend the data contained therein, rows 120 and 122 will initially be identical to each other. As the customer changes row 120, row 122 will provide a constant reference showing the previous forecast provided by that customer. In a preferred embodiment of the present invention, the amended entry to any time period in row 120 is immediately compared to the contents of that same time period in row 124. The difference between these two numbers is compared to an allowable difference (e.g. 25%-50%) to detect typographical errors or potential errors in judgment. If the difference between these two values is greater than the allowed difference, an alarm message will be provided to notify the customer of this situation. However, in a preferred embodiment of the present invention, the customer will be allowed to make the change regardless of whether or not it is beyond the suggested limits.

With continued reference to FIG. 3, if the customer wishes to place an actual firm order for one of the products, 101-103, an appropriate change is made by that customer to the "customer's firm orders" row 126 at the proper time period location. When the customer has completed the changes to the data set 10, the supplier 30 has immediate access to the information contained in rows 120 and 126. The supplier 30 therefore knows what the customer's planned purchases of the various products are and what the customer's actual firm orders are. Based on this information, the supplier 30 can immediately begin to plan for the future production of the products for later delivery to this customer. When all of the information from all of the customers is available, this information can be accumulated into cumulative totals for various "Stock Keeping Units", or SKU's, which are associated with each of the products manufactured by the supplier 30. In addition, since the different SKU's associated with a particular product family 136 have a high degree of commonality, the information can also be accumulated according to product families to facilitate the ordering of certain raw materials, parts that are manufactured by outside suppliers, inventory build-up procedures, and work force allocation.

With continued reference to FIG. 3, the actual SKU for each of the products, 101-103, can be obtained by the customer's placing the cursor 110 over the name of the product, as illustrated with respect to the first product 101, and a small window (not shown in FIG. 3) will appear with the actual SKU identified. Similarly, depressing a mouse button with the cursor 110 in the position shown in is FIG. 3 will result in the four rows, 120, 122, 124, and 126 appearing or disappearing along with the telescoping expansion or compression of the plurality of rows shown in FIG. 3.

At the bottom portion of FIG. 3, the "customer's forecast total" 131, the "customer's previous forecast total" 132, the "all families total" 133, and the "customer's firm orders" 134 rows provide cumulative totals in each of the identified time periods between columns 130 and 132 for these four categories of data. Rows 131-134 allow the customer to keep track of the various forecast numbers provided in the data set 10 and that customer's firm orders.

Figure 4:
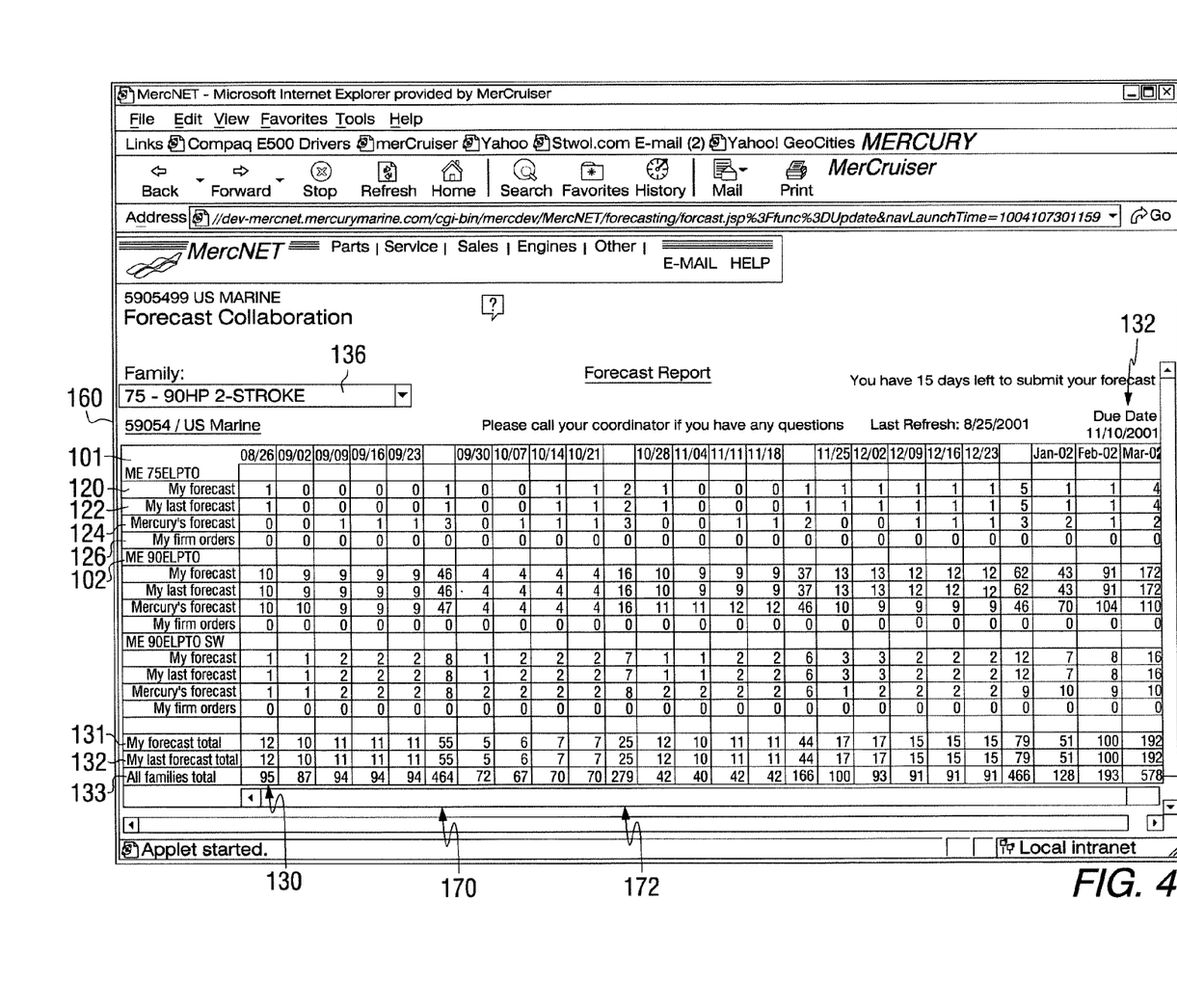
FIG. 4 is an actual representation of a screen display for a particular customer using the present invention.

FIG. 4 is a reproduction of an actual screen display for a particular family of products 136 and for a particular customer 160. Some of the rows and columns in FIG. 4 are identified by reference numeral to assist in a comparison between FIGS. 3 and 4. As can be seen in FIG. 4, the plurality of preselected future periods of time extend from the week of Aug. 26, 2001 in column 130 to the month of March, 2002 in column 132. It should be clearly understood that the time increments for each of the columns in FIG. 4 are not limited to either weekly or monthly periods and can simultaneously comprise both. The short term forecast portion of the display is illustrated on a weekly basis while the later periods of time are represented on a monthly basis. In addition, the first two months, from the week of Aug. 26, 2001, to the week of Oct. 21, 2001, are closed and the customer is no longer permitted to change the entries in those columns. The data contained in the column for the week of Oct. 28, 2001, and onward into the future can be changed by the customer. The most imminent two months are closed to allow the supplier 30 to schedule production of the units that are represented as firm orders by this particular customer 160. It should be understood that the row titled "CUSTOMER'S FIRM ORDERS" is optional in various embodiments of the present invention. That row is illustrated in FIG. 3, but not in FIG. 4.

With continued reference to FIG. 4, it can be seen that columns 170 and 172 are provided to show the monthly totals for the associated weeks shown in the left portion of the screen display.

One capability that the present invention allows is the rewarding of the customers for their individual accuracy in forecasting their own demand level. As an example, the forecast row 120 for any particular customer can be compared to the firm order row 126 for each product. If the firm orders total is close to the forecast total of units for any preselected period of time (e.g. a group of weeks or months), the customer can be rewarded with a discount percentage subtracted from the cost of the products ordered by the customer. This can be done on a monthly or annual basis and the rewards provide a significant incentive for the customers to be careful and accurate in making future forecasts of their own demand for the supplier's products. Also, early entry of firm orders by a particular customer can be used by the supplier to grant a priority to that customer for that product. In other words, if a shortage of products occurs, a customer that places an earlier firm order for a product will receive a priority status for shipment of that product compared to another customer that placed a firm order for that product on a later date. This provides an incentive for early ordering by the customers.

Figure 5:
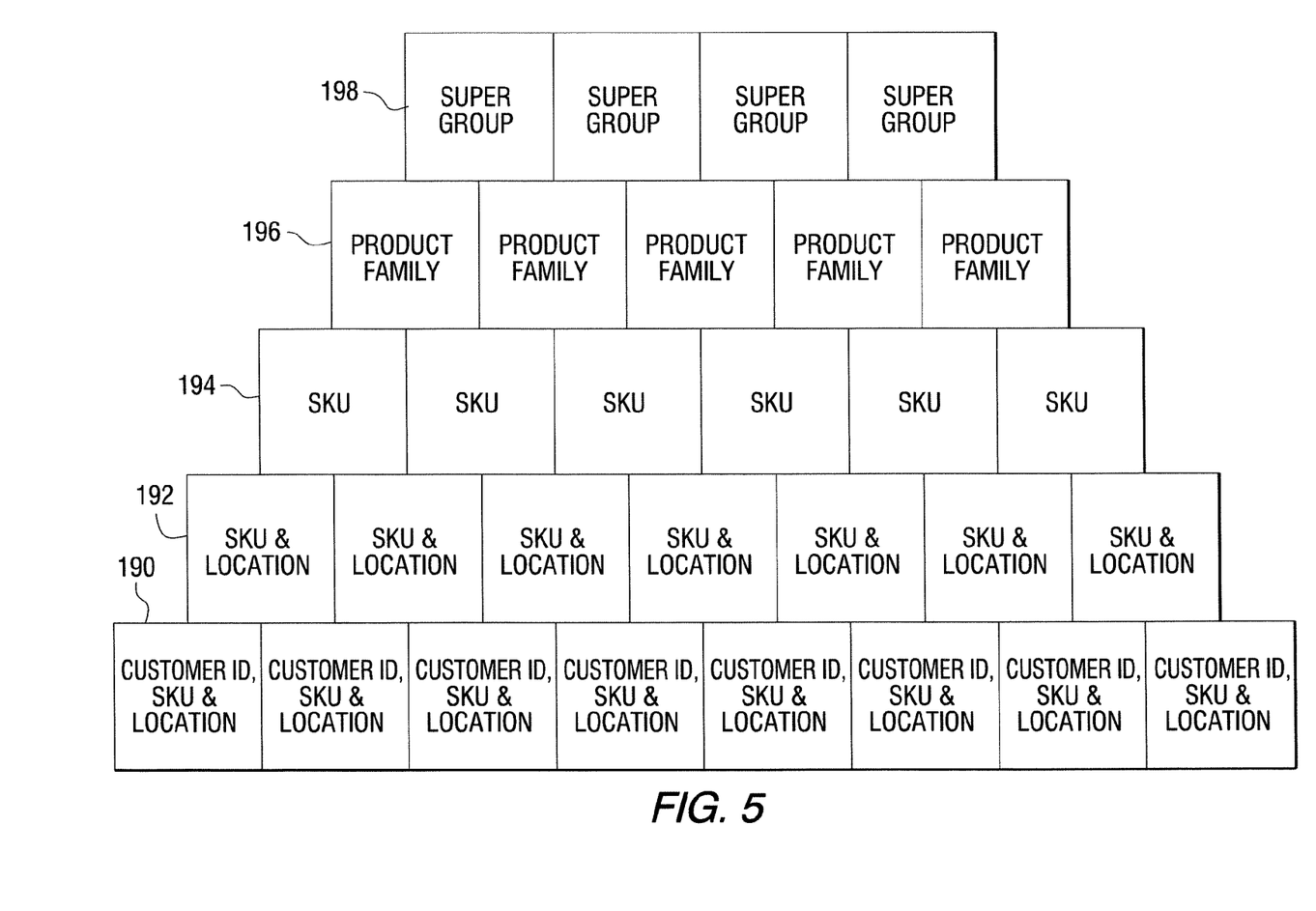
FIG. 5 is a pyramid representation of the manner in which data obtained by the present invention can be used by a supplier.

FIG. 5 is a schematic representation of the possible ways that the data in the data set 10 can be combined to provide useful information for the supplier 30. The data received by the supplier 30 immediately after receiving all of the updates provided by its customers, 41-46, is typically maintained in a manner that is represented by the bottom row 190 shown in FIG. 5. That information is identified by customer ID 160, SKU (associated with rows 101-103), and location. In a preferred embodiment of the present invention, the location associated with any particular forecast or order value is an internal designation identifying either a particular manufacturing facility from which the product will be shipped or a country. It should be understood that the use of this type of location variable is not limiting to the scope of the present invention. It should be understood that each data entry stored in the data set 10 can be segregated according to the customer ID 160, the SKU or product name, 101-103, and the location. When scheduling production for its manufacturing facilities, the supplier 30 is typically most interested in the SKU and location, as represented in row 192 of FIG. 5, and is not as immediately concerned about the particular customer that is to receive the shipment after it is manufactured. In other words, regardless of the particular customer designation, the manufacturer or supplier must order the raw materials, control its inventory, and schedule the appropriate production personnel needed to manufacture the total number of products predicted by all of its customers using the present invention. Therefore, the data contained in row 190 is accumulated, by SKU and location, and saved in that form as represented by row 192 in FIG. 5. Naturally, the supplier may wish to review the total number of units of each SKU that it will ship, regardless of the particular location or customer identification. This is represented in row 194. Similarly, the product family 136 described in conjunction with FIGS. 3 and 4, is of interest to the supplier 30 and is represented in row 196 of FIG. 5. Certain super groups can be helpful to the supplier 30 in some situations. For example, if the supplier is a manufacturer of marine propulsion systems, the super groups can comprise groups that are defined by the particular type of marine propulsion device (e.g. outboard motors, inboard systems). The data contained in the data set 10 and described above can be segregated into any of the categories identified in the five rows shown in FIG. 5.

Figure 6:
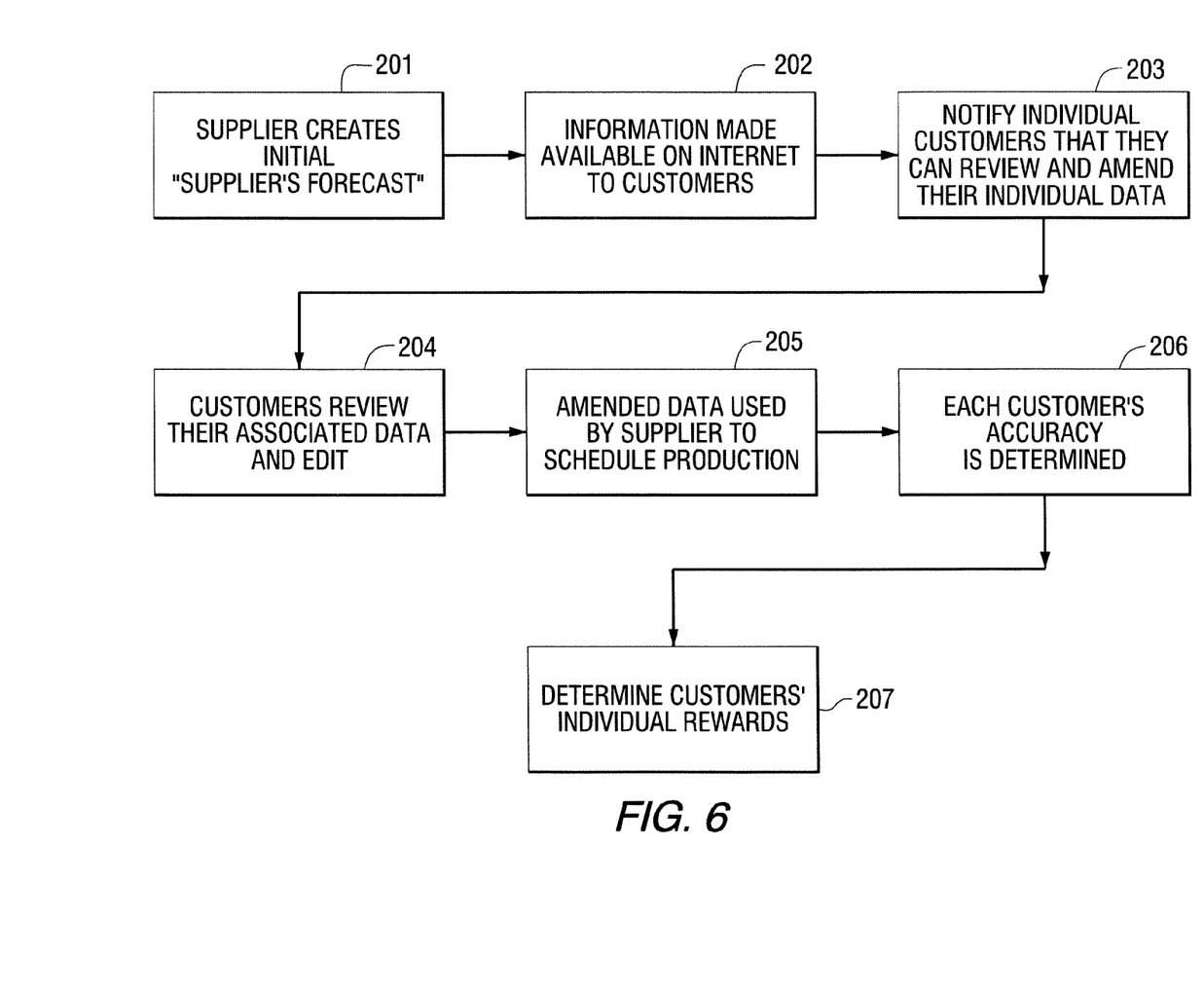
FIG. 6 is a simplified flow chart showing the major process steps of the present invention.

FIG. 6 is a simplified flow chart showing the basic process steps of the present invention. As represented by functional block 201, the supplier creates an initial forecast and includes those numbers in the data set. The initial forecast numbers can be developed in several different ways. Typically, a supplier will use historic information to create the forecast for each individual customer. National economic data and other independent variables can be included in the determination of the initial forecast. As shown in functional block 202, the information contained in the dataset is then made available on the internet to the customers of the supplier. Typically, the customers are each given a particular login name and password in order to be able to visit the website and review the date pertaining to that customer. As shown in functional block 203, each individual customer that will be granted the right to modify the data in the dataset is than notified, typically by e-mail, that a particular time period (e.g. fifteen days) will be allowed for the customer to review and amend the numbers currently contained in the dataset pertaining to that customer. The customer can then review the associated data that was initially provided by the supplier as a forecast of that particular customer's future purchases. This is represented in functional block 204. After the allowed time period has elapsed, the amended data is then used by the supplier to schedule its production, as shown in functional block 205. Although the flow chart in FIG. 6 is highly simplified, it should be understood that the steps represented by functional blocks 203-205, can be repeated on a periodic basis to allow all of the customers to review their respective data again and make changes. This periodic review can be performed on a monthly or quarterly basis. It should also be understood that these same functional blocks, 203-205, include the capable of the customer to enter actual orders into the dataset. It should also be understood that previously amended data can again be reviewed and edited, as long as the dates of the amended data are sufficiently in advance of the current date to allow the supplier to react to the changed numbers.

With continued reference to FIG. 6, the present invention allows the supplier to periodically review each customers accuracy. This is shown in functional block 206 and represents the process under which the supplier compares the actual orders placed by each customer to the forecast provided by that customer. For the purpose of properly and efficiently scheduling production, it is important that the customers provide forecast information that is accurate. Otherwise, the supplier's production rates will not accommodate the shipment rates of the supplier's product. In functional block 207, the present invention allows the supplier to determine individual rewards, such as rebates, or discounts, in order to provide an incentive for accurate forecasting.

The method for coordinating production by a supplier 30 with requirements of one or more customers, 41-46, made in accordance with the preferred embodiment of the present invention, comprises the step of providing a data set 10 which is accessible on the internet and which has a first portion 21 associated with a first customer 41 and a second portion 22 associated with a second customer 42, and so on. The first portion 21 comprises a first forecast demand schedule 124 for a first product 101 and a second product 102. Naturally, the present invention can be used with a much larger number of products than is illustrated in FIGS. 3 and 4. The first forecast demand schedule defines an estimated number of units of the plurality of products required by the first customer 160 for each one of the plurality of preselected future periods of time which are represented by columns 130 to 132. Another step of the present invention is allowing the first customer 160 to access the first forecast demand schedule 120 of the first portion 21 of the data set 10 on the internet. The present invention further comprises the step of allowing the first customer 160 to change the estimated number of units of the plurality of products required by the first customer for one or more of the plurality of preselected future periods of time, as represented by the columns 130 through 132. The present invention further comprises the step of utilizing the forecast demand schedule 120 of the first portion 21 of the data set 10, after the first customer 160 has accessed the forecast demand schedule of the first portion of the data set on the internet, to schedule production of its plurality of products by the supplier. Naturally, each of the customers, 41-46, of the supplier 30 is allowed to independently access its associated portion, 21-26, of the data set 10 and change the forecast demand schedule pertaining to that particular customer.

The important advantage of the present invention is that it allows the customers of a supplier to become directly involved in the demand forecasting process relating to the production planning of the supplier. Rather than relying on its own forecasts, the supplier can use the actual forecasts made by the customers, who are often in a much better position to predict the actual future demand for the supplier's products. The system is a collaborative system that comprises an initial step of having the supplier provide an initial forecast with which the customer can work. The customer is allowed to amend any of the forecasted demand levels in the schedule by increasing or decreasing that number. In a preferred embodiment of the present invention, the customers are allowed to amend the forecast schedule as far as a year in advance. Although the forecast numbers provided by the customers are not always precisely accurate, these inputs provided by the customers allow the supplier to consider those forecasts in its own production planning process. The present invention also provides a firm order row 126 for each product so that the customer can place firm orders for each of the products manufactured or supplied by the supplier 30. This allows the supplier to treat the forecast numbers and the firm order numbers provided by the customers in different ways, potentially giving more weight to the firm order numbers than to the forecast numbers. However, both of these forecasts provide information to the supplier well in advance of the actual expected delivery of the products to the customers. Therefore, both of these inputs can be used, with varying degrees of reliance, by the supplier to plan its own purchases and manufacturing efforts well in advance of the actual date when the products are required by the customers.

As discussed above, the provision by which the customer can enter firm orders directly into the database by using the internet is not a characteristic of all embodiments of the present invention. Although a preferred capability, certain more basic embodiments of the present invention require the customer to enter firm orders by providing an alternative ordering method (e.g. by conventional mail, electronic mail, or telephone) so that the supplier can review the details of the firm order prior to entering that firm order into the database. This avoids possible confusion that could be caused by typographical errors made by the customer that might not be discovered until too late in the process. Either option is available within the scope of the present invention.

Although the present invention has been described with particular specificity and illustrated to show a particularly preferred embodiment, it should be understood that alternative embodiments are also within its scope.

We claim:

1. A method for coordinating production by a supplier with requirements of one or more customers, comprising the steps of:

determining a first delivery forecast schedule for a first product for a plurality of preselected future periods of time, said first delivery forecast schedule defining an estimated number of units of said first product required by said first customer for each one of said plurality of preselected future periods of time;

making said first delivery forecast schedule available to said first customer on the internet;

permitting said first customer to create an amended first delivery forecast schedule by amending said number of units associated with one or more of said plurality of preselected future periods of time of said first delivery forecast schedule;

accessing said amended first delivery forecast schedule subsequent to said permitting step;

scheduling production of said first product by said supplier as a function of said amended first delivery forecast schedule;

determining a second delivery forecast schedule for a second product for said plurality of preselected future periods of time, said second delivery forecast schedule defining an estimated number of units of said second product required by said first customer for each one of said plurality of preselected future periods of time;

making said second delivery forecast schedule available to said first customer on the internet;

permitting said first customer to create an amended second delivery forecast schedule by amending said number of units associated with one or more of said plurality of preselected future periods of time of said second delivery forecast schedule;

accessing said amended second delivery forecast schedule subsequent to said permitting step; and scheduling production of said second product by said supplier as a function of said amended second delivery forecast schedule.

2. The method of claim 1, wherein:
each one of plurality of preselected future periods of time is a calendar month.

3. The method of claim 1, wherein:
each one of plurality of preselected future periods of time is a calendar week.

4. The method of claim 1, further comprising:
comparing said amended first delivery forecast schedule to said first delivery forecast schedule; and
determining, as a function of said comparing step, whether said amended first delivery forecast schedule is acceptable.

5. The method of claim 4, wherein:
said comparing and determining steps precede said scheduling step.

6. The method of claim 4, further comprising:
providing an alarm signal to alert said first customer if said amended forecast production schedule is not acceptable.

7. The method of claim 1, wherein:
said amended first delivery forecast schedule is generally equal to said first delivery forecast schedule and changes made by said first customer by said first customer amending said number of units associated with one or more of said plurality of preselected future periods of time of said first delivery forecast schedule as described in said permitting step.

8. The method of claim 1, wherein:
said supplier is a manufacturer of said first product.

9. The method of claim 8, wherein:
said production scheduling step comprises the step of scheduling manufacture of a plurality of units of said first product in order to satisfy said amended first delivery forecast schedule.

10. A method for coordinating production by a supplier with requirements of one or more customers, comprising the steps of:

determining a first delivery forecast schedule for a first product for a plurality of preselected future periods of time, said first delivery forecast schedule defining an estimated number of units of said first product required by said first customer for each one of said plurality of preselected future periods of time;

making said first delivery forecast schedule available to said first customer on the internet;

permitting said first customer to create an amended first delivery forecast schedule by amending said number of units associated with one or more of said plurality of preselected future periods of time of said first delivery forecast schedule;

accessing said amended first delivery forecast schedule subsequent to said permitting step;

scheduling production of said first product by said supplier as a function of said amended first delivery forecast schedule;

comparing said amended first delivery forecast schedule to said first delivery forecast schedule;

determining, as a function of said comparing step, whether said amended version of said forecast production schedule is acceptable;

providing an alarm signal to alert said first customer if said amended forecast production schedule is not acceptable;

determining a second delivery forecast schedule for a second product for said plurality of preselected future periods of time, said second delivery forecast schedule defining an estimated number of units of said second product required by said first customer for each one of said plurality of preselected future periods of time;

making said second delivery forecast schedule available to said first customer on the internet;

permitting said first customer to create an amended second delivery forecast schedule by amending said number of units associated with one or more of said plurality of preselected future periods of time of said second delivery forecast schedule;

accessing said amended second delivery forecast schedule subsequent to said permitting step; and scheduling production of said second product by said supplier as a function of said amended second delivery forecast schedule.

11. The method of claim 10, wherein:
said comparing and determining steps precede said scheduling step.

12. The method of claim 10, further comprising:
determining a first delivery forecast schedule for a first product for said plurality of preselected future periods of time, said first delivery forecast schedule defining an estimated number of units of said first product required by a second customer for each one of said plurality of preselected future periods of time;

making said first delivery forecast schedule available to said second customer on the internet;

permitting said second customer to create said amended first delivery forecast schedule by amending said number of units associated with one or more of said plurality of preselected future periods of time of said first delivery forecast schedule;

accessing said amended first delivery forecast schedule subsequent to said permitting step; and scheduling production of said first product by said supplier as a function of said amended first delivery forecast schedule.

13. The method of claim 12, further comprising:
determining a second delivery forecast schedule for a second product for said plurality of preselected future periods of time, said second delivery forecast schedule defining an estimated number of units of said second product required by said second customer for each one of said plurality of preselected future periods of time;

making said second delivery forecast schedule available to said second customer on the internet;

permitting said second customer to create an amended second delivery forecast schedule by amending said number of units associated with one or more of said plurality of preselected future periods of time of said second delivery forecast schedule;

accessing said amended second delivery forecast schedule subsequent to said permitting step; and scheduling production of said second product by said supplier as a function of said amended second delivery forecast schedule.

14. The method of claim 13, wherein:

said amended first delivery forecast schedule is generally equal to said first delivery forecast schedule and changes made by said first customer by said first customer amending said number of units associated with one or more of said plurality of preselected future periods of time of said first delivery forecast schedule as described in said permitting step.

15. The method of claim 13, wherein:

said supplier is a manufacturer of said first product.

16. The method of claim 15, wherein:

said production scheduling step comprises the step of scheduling manufacture of a plurality of units of said first product in order to satisfy said amended first delivery forecast schedule.

17. The method of claim 10, wherein:

each one of plurality of preselected future periods of time is a calendar month.

18. The method of claim 10, wherein:

each one of plurality of preselected future periods of time is a calendar week.

19. A method for coordinating production by a supplier with requirements of one or more customers, comprising the steps of:

determining a first delivery forecast schedule for a first product for a plurality of preselected future periods of time, said first delivery forecast schedule defining an estimated number of units of said first product required by a first customer for each one of said plurality of preselected future periods of time;

making said first delivery forecast schedule available to said first customer on the internet;

permitting said first customer to create an amended first delivery forecast schedule by amending said number of units associated with one or more of said plurality of preselected future periods of time of said first delivery forecast schedule;

accessing said amended first delivery forecast schedule subsequent to said permitting step;

scheduling production of said first product by said supplier as a function of said amended first delivery forecast schedule;

comparing said amended first delivery forecast schedule to said first delivery forecast schedule;

determining, as a function of said comparing step, whether said amended version of said forecast production schedule is acceptable;

providing an alarm signal to alert said first customer if said amended forecast production schedule is not acceptable;

said comparing and determining steps precede said scheduling step;

determining a second delivery forecast schedule for a second product for said plurality of preselected future periods of time, said second delivery forecast schedule defining an estimated number of units of said second product required by said first customer for each one of said plurality of preselected future periods of time;

making said second delivery forecast schedule available to said first customer on the internet;

permitting said first customer to create an amended second delivery forecast schedule by amending said number of units associated with one or more of said plurality of preselected future periods of time of said second delivery forecast schedule;

accessing said amended second delivery forecast schedule subsequent to said permitting step;

scheduling production of said second product by said supplier as a function of said amended second delivery forecast schedule;

determining a first delivery forecast schedule for a first product for said plurality of preselected future periods of time, said first delivery forecast schedule defining an estimated number of units of said first product required by a second customer for each one of said plurality of preselected future periods of time;

making said first delivery forecast schedule available to said second customer on the internet;

permitting said second customer to create said amended first delivery forecast schedule by amending said number of units associated with one or more of said plurality of preselected future periods of time of said first delivery forecast schedule;

accessing said amended first delivery forecast schedule subsequent to said permitting step;

scheduling production of said first product by said supplier as a function of said amended first delivery forecast schedule;

determining a second delivery forecast schedule for a second product for said plurality of preselected future periods of time, said second delivery forecast schedule defining an estimated number of units of said second product required by said second customer for each one of said plurality of preselected future periods of time;

making said second delivery forecast schedule available to said second customer on the internet;

permitting said second customer to create an amended second delivery forecast schedule by amending said number of units associated with one or more of said plurality of preselected future periods of time of said second delivery forecast schedule;

accessing said amended second delivery forecast schedule subsequent to said permitting step; and scheduling production of said second product by said supplier as a function of said amended second delivery forecast schedule, said supplier being a manufacturer of said first product, said production scheduling step comprising the step of scheduling manufacture of a plurality of units of said first product in order to satisfy said amended first delivery forecast schedule.

20. The method of claim 19, wherein:

said amended first delivery forecast schedule is generally equal to said first delivery forecast schedule and changes made by said first customer by said first customer amending said number of units associated with one or more of said plurality of preselected future periods of time of said first delivery forecast schedule as described in said permitting step.

21. The method of claim 19, wherein:

each one of plurality of preselected future periods of time is a calendar month.

22. The method of claim 19, wherein:

each one of plurality of preselected future periods of time is a calendar week.

* * * * *